(12) United States Patent
Johansson et al.

(10) Patent No.: US 10,849,164 B2
(45) Date of Patent: Nov. 24, 2020

(54) HIGH RELIABILITY AND EARLY DATA TRANSMISSION

(71) Applicant: MEDIATEK INC., Hsinchu (TW)

(72) Inventors: Per Johan Mikael Johansson, Vikarbyn (SE); Shiang Jiun Lin, Hsinchu (TW); Li-Chuan Tseng, Hsinchu (TW); Gilles Charbit, Cambridge (GB)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/145,788

(22) Filed: Sep. 28, 2018

(65) Prior Publication Data

US 2019/0223221 A1    Jul. 18, 2019

Related U.S. Application Data

(60) Provisional application No. 62/565,199, filed on Sep. 29, 2017.

(51) Int. Cl.
| | | |
|---|---|---|
| *H04W 4/00* | (2018.01) | |
| *H04W 74/08* | (2009.01) | |
| *H04W 76/27* | (2018.01) | |
| *H04W 88/02* | (2009.01) | |
| *H04W 68/02* | (2009.01) | |
| *H04W 72/04* | (2009.01) | |

(Continued)

(52) U.S. Cl.
CPC ....... *H04W 74/0833* (2013.01); *H04W 68/00* (2013.01); *H04W 68/02* (2013.01); *H04W 72/0453* (2013.01); *H04W 76/19* (2018.02); *H04W 76/27* (2018.02); *H04W 88/023* (2013.01)

(58) Field of Classification Search
CPC . H04W 75/0833; H04W 76/19; H04W 76/27; H04W 72/0453; H04W 68/00; H04W 68/02; H04W 88/023
USPC .................... 370/329–330, 335–348
See application file for complete search history.

(56) References Cited

U.S. PATENT DOCUMENTS

| | | |
|---|---|---|
| 2010/0227569 A1 | 9/2010 | Bala et al. ............... 455/73 |
| 2018/0132282 A1 | 5/2018 | Ly et al. |

(Continued)

OTHER PUBLICATIONS

International Search Report and Written Opinion of International Search Authority for PCT/CN2018/108683 dated Jan. 4, 2019 (10 pages).

(Continued)

*Primary Examiner* — Thai D Hoang
(74) *Attorney, Agent, or Firm* — Imperium Patent Works; Zheng Jin (57) ABSTRACT

A method of high reliability and early data transmission (EDT) is proposed. EDT allows one uplink transmission (optionally) followed by one downlink data transmission during a random-access channel (RACH) procedure, which can reduce the signaling overhead and save UE power. To improve reliability, for uplink EDT, there would be different set of RACH reattempt parameters in the UE for different types of access. For downlink EDT, there would be an indication in the paging message to trigger whether the UE would use legacy RACH or not. Further, the configuration for PRACH resource for EDT can be independent to legacy PRACH resource configuration. Under certain conditions, UE can fallback to legacy RACH procedure for high reliability.

20 Claims, 6 Drawing Sheets

(51) Int. Cl.
　　　*H04W 76/19*　　　(2018.01)
　　　*H04W 68/00*　　　(2009.01)

(56) References Cited

U.S. PATENT DOCUMENTS

| | | | | |
|---|---|---|---|---|
| 2018/0324854 | A1* | 11/2018 | Phuyal | H04W 74/0833 |
| 2018/0324869 | A1* | 11/2018 | Phuyal | H04W 74/0833 |
| 2019/0037447 | A1* | 1/2019 | Lee | H04W 28/18 |
| 2019/0045554 | A1* | 2/2019 | Ye | H04W 76/27 |
| 2019/0104470 | A1* | 4/2019 | Johansson | H04W 72/0446 |
| 2019/0104553 | A1* | 4/2019 | Johansson | H04W 72/0453 |
| 2019/0141515 | A1 | 5/2019 | Kim et al. | |
| 2019/0159257 | A1 | 5/2019 | Rico Alvarino et al. | |
| 2019/0159260 | A1 | 5/2019 | Charbit et al. | |
| 2019/0182897 | A1 | 6/2019 | Jain et al. | |
| 2019/0182899 | A1 | 6/2019 | Ye et al. | |
| 2019/0223221 | A1 | 7/2019 | Johansson et al. | |
| 2019/0253121 | A1 | 8/2019 | Islam et al. | |
| 2019/0313383 | A1 | 10/2019 | Xiong et al. | |
| 2019/0319764 | A1 | 10/2019 | Nader et al. | |
| 2019/0350037 | A1* | 11/2019 | Lee | H04W 76/18 |

OTHER PUBLICATIONS

R2-1815372 3GPP TSG-RAN WG2 Meeting #103bis, MediaTek Inc., "Mobile-terminated Early Data Transmission", Chengdu, China, Oct. 8-12, 2018 (6 pages) *pp. 3-6, section 4*.

R2-1811885 3GPP TSG-RAN WG2 Meeting#103, Institute for Information Industry (III), "Mobile terminated early data transmission", Gothenburg, Sweden, Aug. 20-24, 2018 (3 pages) *pp. 1-4, section 2*.

R1-1708200 3GPP TSG RAN WG1 Meeting #89, Huawei et al., "On early data transmission for NB-loT", Hangzhou, China, May 15-19, 2017 (3 pages) *pp. 1-2, section 2*.

R1-1712804 3GPP TSG RAN WG1 Meeting #90, Qualcomm Incorporated, "Early data transmission", Prague, Czech Republic, Aug. 21-25, 2017 (17 pages).

International Search Report and Written Opinion of International Search Authority for PCT/CN2018/108685 dated Jan. 4, 2019 (9 pages).

R2-1707805 3GPP TSG-RAN WG2 Meeting #99, ZTE, "Consideration on early data transmission in FeNB-LoT", Berlin, Germany, Aug. 21-25, 2017 (11 pages) *2.3 possible procedures*.

R1-1713321 3GPP TSG RAN Wg1 Meeting #90, ZTE, "On early data transmission for NB-IoT", Prague, Czech Republic, Aug. 21-25, 2017 (5 pages) *2 discussion*.

R2-1709335 3GPP TSG RAN Wg2 Meeting #99, Huawei et al., "Enhanced UP solution for early data transmission in MTC", Berlin, Germany, Aug. 21-25, 2017 (3 pages).

USPTO, office action for related U.S. Appl. No. 16/145,752 dated Oct. 28, 2019 (16 pages).

* cited by examiner

| RRC parameters | Description |
|---|---|
| nprach-Periodicity | Periodicity of a NPRACH resource |
| nprach-StartTime | Start time of the NPRACH resource in one period |
| nprach-SubcarrierOffset | Frequency location of the NPRACH resource |
| nprach-NumSubcarriers | Number of sub-carriers in a NPRACH resource |
| nprach-SubcarrierMSG3-RangeStart | Fraction for calculating the starting subcarrier index of the range reserved for indication of UE support for multi-tone Msg3 transmission, within the NPRACH resource |
| maxNumPreambleAttemptCE | Maximum number of preamble transmission attempts per NPRACH resource |
| numRepetitionsPerPreambleAttempt | Number of NPRACH repetitions per attempt for each NPRACH resource |
| nprach-NumCBRA-StartSubcarriers | The number of start subcarriers from which a UE can randomly select a start subcarrier |

FIG. 6

Table 2: NPRACH parameters for EDT

| RRC parameters | Description |
|---|---|
| nprach-Periodicity-EDT | Periodicity of a NPRACH resource for EDT |
| nprach-StartTime-EDT | Start time of the NPRACH resource for EDT in one period |
| nprach-SubcarrierOffset-EDT | Frequency location of the NPRACH resource for EDT |
| nprach-NumSubcarriers-EDT | Number of sub-carriers in a NPRACH resource for EDT |
| nprach-SubcarrierMSG3-RangeStart-EDT | Fraction for calculating the starting subcarrier index of the range reserved for indication of UE support for multi-tone Msg3 transmission, within the NPRACH resource for EDT |
| maxNumPreambleAttemptCE-EDT | Maximum number of preamble transmission attempts per NPRACH resource for EDT |
| numRepetitionsPerPreambleAttempt-EDT | Number of NPRACH repetitions per attempt for each NPRACH resource for EDT |
| nprach-NumCBRA-StartSubcarriers-EDT | The number of start subcarriers from which a UE can randomly select a start subcarrier for EDT |
| nprach-TBSMsg3-EDT | The TBS of Msg3 associates to the NPRACH resource for EDT |

HIGH RELIABILITY AND EARLY DATA TRANSMISSION

CROSS REFERENCE TO RELATED APPLICATION

This application claims priority under 35 U.S.C. § 119 from U.S. Provisional Application No. 62/565,199, entitled "High Reliability and Early Data Transmission," filed on Sep. 29, 2017, the subject matter of which is incorporated herein by reference.

TECHNICAL FIELD

The disclosed embodiments relate generally to wireless communication systems, and, more particularly, to user equipments (UEs) support high reliability and early data transmission.

BACKGROUND

3GPP Long-Term Evolution (LTE) systems offer high peak data rates, low latency, improved system capacity, and low operating cost resulting from simple network architecture. A 3GPP LTE system also provides seamless integration to older wireless network, such as GSM, CDMA and Universal Mobile Telecommunication System (UMTS). Enhancements to LTE systems are considered so that they can meet or exceed IMA-Advanced fourth generation (4G) standard. One of the key enhancements is to support bandwidth up to 100 MHz and be backwards compatible with the existing wireless network system. In LTE/LTE-A systems, an evolved universal terrestrial radio access network (E-UTRAN) includes a plurality of evolved Node-Bs (eNBs) communicating with a plurality of mobile stations, referred as user equipments (UEs).

Supporting high reliability or varying degree of reliability and quality of service (QoS) differentiation is not straightforward if applied to transmissions that are early. In current 3GPP systems, the methods for high reliability or varying degree of reliability is related to transmission protocols such as Hybrid Automatic Repeat reQuest (HARQ) and Radio Link Control Acknowledged Mode (RLC-AM) that are configured and controlled by a base station. For machine-to-machine (M2M) systems such as Narrowband Internet of Things (NB-IoT) and LTE Machine Type Communication (MTC), optimizations are put in place to make possible transmissions of data that are integrated with the control procedures at the time of access.

The problem for such transmission is that the normal radio resource control (RRC) protocols has not yet been configured and enabled at the time of transmission, and the normal mechanisms for data transmission reliability are not enabled. However, there is still a requirement for varying degree of reliability for M2M devices. For example, for the transmission of an alarm indication, the reliability requirement is very high. On the other hand, for a normal M2M statistics or meter report, it may be better to drop a certain report rather than wasting a lot of battery trying to achieve high reliability. Furthermore, M2M devices can be located in exceptionally bad radio coverage, e.g. basements, and thus transmissions and retransmissions can be very costly.

A solution is sought.

SUMMARY

A method of high reliability and early data transmission (EDT) is proposed. EDT allows one uplink transmission (optionally) followed by one downlink data transmission during a random-access channel (RACH) procedure, which can reduce the signaling overhead and save UE power. To improve reliability, for uplink EDT, there would be different set of RACH reattempt parameters in the UE for different types of access. For downlink EDT, there would be an indication in the paging message to trigger whether the UE would use legacy RACH or not. Further, the configuration for PRACH resource for EDT can be independent to legacy PRACH resource configuration. Under certain conditions, UE can fallback to legacy RACH procedure for high reliability.

In one embodiment of UL EDT, a UE receives a configuration for early data transmission (EDT) in a wireless communication network. The UE initiates a random-access channel (RACH) procedure with EDT by transmitting a preamble (MSG1) to a base station over a physical RACH (PRACH) resource. The UE transmits a radio resource control (RRC) connection or resume request (MSG3) to the base station upon receiving a random-access response (MSG2). The RRC connection or resume request is bundled with uplink data. The UE re-attempts the RACH procedure with EDT upon a RACH failure. The UE fallbacks to a legacy RACH procedure after a maximum number of RACH attempts for EDT.

From BS perspective of UL EDT, a base station transmits a configuration for early data transmission (EDT) to a UE in a wireless communication network. The configuration comprises a maximum number of random-access channel (RACH) attempts for EDT. The base station receives a random-access preamble (MSG1) from the UE over a physical RACH (PRACH) resource. The base station transmits a random-access response (MSG2) to the UE. The base station receives a radio resource control (RRC) connection or resume request (MSG3) from the UE. The RRC connection or resume request is bundled with uplink data for EDT.

In another embodiment of DL EDT, a UE receives a paging message from a base station to establish a radio resource control connection in a wireless communication network. The paging message comprises an indication on whether to allow early data transmission (EDT). The UE initiates a random-access channel (RACH) procedure with EDT by transmitting a preamble (MSG1) to the base station over a physical RACH (PRACH) resource. The UE transmits an RRC connection or resume request (MSG3) to the base station upon receiving a random-access response (MSG2). The UE receives a contention resolution (MSG4) from the base station. MSG4 is bundled with downlink data when EDT is allowed for the UE.

From BS perspective of DL EDT, a base station transmits a paging message to a user equipment (UE) to establish a radio resource control connection in a wireless communication network. The paging message comprises an indication on whether to allow early data transmission (EDT). The base station receives a preamble (MSG1) from the UE over a physical random-access channel (PRACH) resource. The base station transmits a random-access response (MSG2) to the UE and in response receiving an RRC connection or resume request (MSG3) from the UE. The base station transmits a contention resolution (MSG4) to the UE. MSG4 is bundled with downlink data when EDT is allowed for the UE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 shows the NPRACH parameters in the system information.

FIG. 7 shows NRPACH parameters for EDT.

DETAILED DESCRIPTION

Reference will now be made in detail to some embodiments of the invention, examples of which are illustrated in the accompanying drawings.

Figure 1:
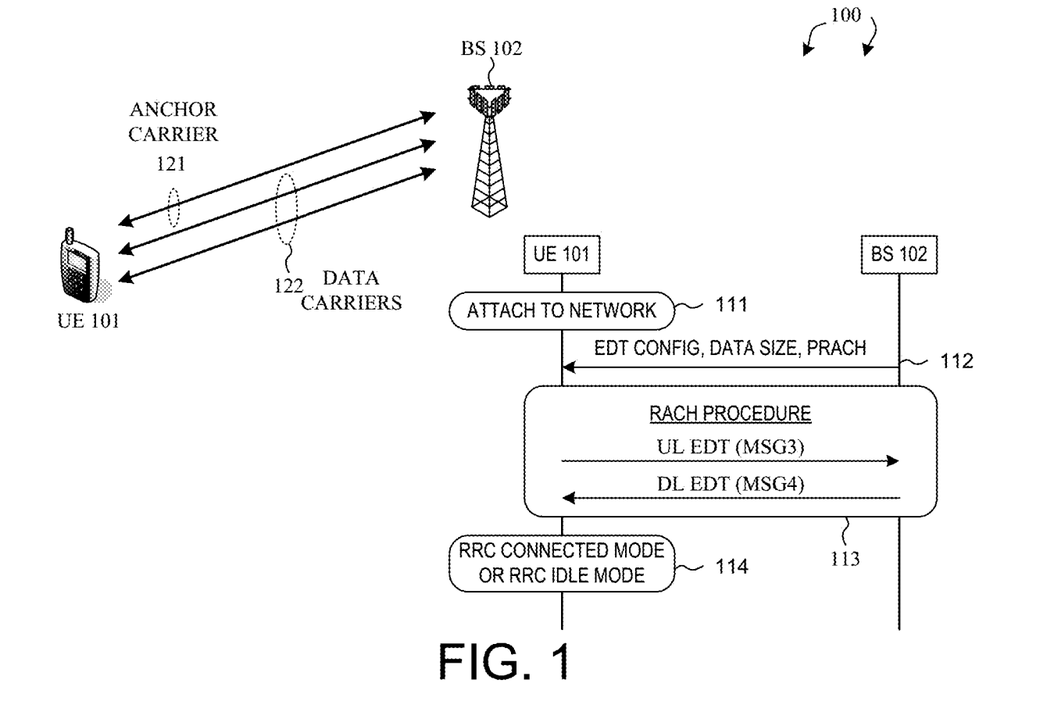
FIG. 1 illustrates a user equipment (UE) supporting high reliability and early data transmission (EDT) for both uplink and downlink in a 4G/5G network in accordance with one novel aspect.

FIG. 1 illustrates a user equipment (UE) supporting high reliability and early data transmission (EDT) for both uplink and downlink in a 4G/5G network 100 in accordance with one novel aspect. In LTE/LTE-A systems, an evolved universal terrestrial radio access network (E-UTRAN) includes a plurality of base stations, referred as evolved Node-Bs (eNodeBs or eNBs) communicating with a plurality of mobile stations, referred as user equipments (UEs). In next generation 5G systems, base station is referred to as gNodeBs or gNBs. Both eNB and gNB are referred to as base station (BS). Operations for UE could be divided to two radio resource control (RRC) states: RRC_CONNECTED and RRC_IDLE. In RRC_CONNECTED mode, UE establishes a dedicated connection with the network. UE is ensured to make seamless data transmission with BS when the UE is in RRC_CONNECTED mode.

In FIG. 1, Mobile communication network 100 is an OFDM/OFDMA system comprising BS 102 and UE 101. Initially, UE 101 camps on a cell and stays RRC_Idle mode. For data transmission, UE 101 needs to establish an RRC connection with BS 102 and enter in RRC_Connected mode. Under multicarrier operation, a UE may camp on one NB-IOT carrier and then transmitting and receiving data on another carrier. For example, UE 101 may camp on anchor carrier 121, and then perform data exchange with BS 102 over one of the no-anchor data carriers 122. When there is a downlink packet to be sent from BS to UE, each UE gets a downlink assignment, e.g., a set of radio resources in a physical downlink shared channel (PDSCH). When a UE needs to send a packet to eNodeB in the uplink, the UE gets a grant from the eNodeB that assigns a physical uplink shared channel (PUSCH) consisting of a set of uplink radio resources. The UE gets the downlink or uplink scheduling information from a physical downlink control channel (PDCCH) that is targeted specifically to that UE. Since radio resources and network capacity are limited, it is impossible to keep all UEs in RRC_CONNECTED mode. Inactive UEs are therefore released to RRC_IDLE mode. An idle UE can receive system information broadcasted from eNodeB. The state transition between RRC Connected and RRC Idle modes introduces signaling overhead.

In the example of FIG. 1, UE 101 is a narrowband Internet of Things (NB-IoT) device. Coverage extension, UE complexity reduction, long battery lifetime, and backward compatibility are common objectives for NB-IoT devices. Specifically, for machine-to-machine (M2M) systems such as NB-IoT and Machine Type Communication (MTC), optimizations are put in place to make possible transmissions of data that are integrated with the control procedures at the time of access. The problem for such early data transmission (EDT) is that the normal RRC layer protocols has not yet been configured and enabled at the time of transmission, and the normal mechanisms for data transmission reliability are not enabled. However, there is still a requirement for varying degree of reliability for M2M devices, especially when they are located in exceptionally bad radio coverage, e.g. basements, and thus transmissions and retransmissions can be very costly.

In accordance with one novel aspect, a method of high reliability and early data transmission (EDT) is proposed. EDT allows one uplink transmission followed by one downlink data transmission during a random-access channel (RACH) procedure, which can reduce the signaling overhead and save UE power. For EDT, it can be separated into MO-EDT (Mobile Originated early data transmission) and MT-EDT (Mobile terminated early data transmission). MO-EDT or UL-EDT is triggered by the UE for UL data transmission. After UE transmit the UL data in MSG3, if there is DL data for this UE in the network side, the network can transmit the DL data in MSG4. For MO-EDT, the DL data can be optional. MT-EDT or DL-EDT is triggered by the network (by paging) for DL data transmission. Through the use of the paging message, the network indicates to UE whether to apply the DL-EDT procedure.

As illustrated in FIG. 1, in step 111, UE 101 camps on a cell and attach to the network. UE 101 then receives configuration for EDT from BS 102 in step 112. The configuration comprises data size, number of reattempts, and physical random-access channel (PRACH) resource allocation for EDT. UE 101 then returns to RRC idle for power saving. Next, UE 101 performs RACH procedure to gain access to the network based on the EDT configuration (step 113). For UL-EDT, MSG3 of the RACH procedure can be used; for DL-EDT, MSG4 of the RACH procedure can be used. In step 114, UE 101 goes to RRC Connected mode or stays in RRC Idle mode.

To improve reliability, for UL-EDT, there would be different set of access reattempt parameters in the UE for different types of access. For DL-EDT, there would be an indication in the paging message to trigger whether the UE would use legacy RACH or not for the paging response, or alternatively there would just be an indication in network signalling to the base-station that whether or not MSG4 signalling and data should be bundled together for DL-EDT. Further, the configuration for PRACH resource for EDT can be independent to legacy PRACH resource configuration. Under certain conditions, UE can fallback to legacy RACH procedure for high reliability.

Figure 2:
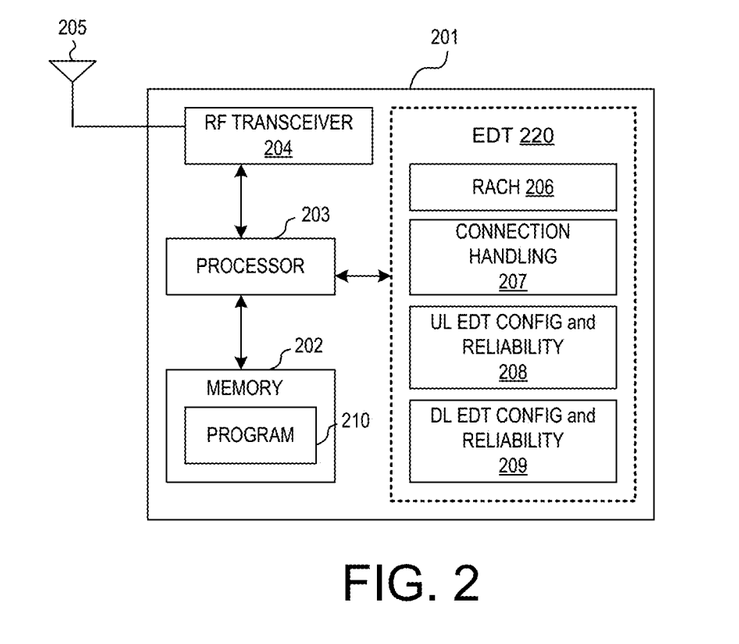
FIG. 2 is a simplified block diagram of a UE for supporting embodiments of the present invention in accordance with one novel aspect.

FIG. 2 is a simplified block diagram of a UE for supporting embodiments of the present invention in accordance with one novel aspect. UE 201 has memory 202, a processor 203, and radio frequency (RF) transceiver module 206. RF transceiver 204 is coupled with antenna 205, receives RF signals from antenna 207, converts them to baseband signals, and sends them to processor 203. RF transceiver 204 also converts received baseband signals from the processor 203, converts them to RF signals, and sends out to antenna 205. Processor 203 processes the received baseband signals and invokes different functional modules to perform features in UE 201. Memory 202 stores data and program instructions 210 to be executed by the processor to control the operations of UE 201. Suitable processors include, by way of example, a special purpose processor, a digital signal processor (DSP), a plurality of microprocessors, one or more microprocessors associated with a DSP core, a controller, a microcontroller, Application specific integrated circuits (ASICs), Field programmable gate array (FPGAs) circuits, and other type of integrated circuit (IC), and/or state machine. A processor in associated with software may be used to implement and configure features of UE 201.

UE 201 also includes multiple function modules and circuits that carry out different tasks in accordance with embodiments of the current invention. The function modules and circuits may be implemented and configured by hardware, firmware, software, and combinations of the above. In one example, early data transmission EDT module 220 further comprises several functional modules and circuits. RACH handling circuit 206 that performs RACH procedure according to broadcasted RACH configuration for EDT or for legacy RACH. Connection handling circuit 207 that performs cell selection or reselection, connection establishment or reselection, and handover procedures such that UE camps on in Idle mode or connects to a serving cell in Connected mode. UL EDT config and reliability handling circuit 208 configures UE 201 for UL EDT operation and handles RACH re-attempts upon EDT failure, and fallbacks to a legacy RACH procedure under certain conditions. DL EDT config and reliability handling circuit 209 configures UE 201 for DL EDT operation with reliability, where the use of fixed configuration RLC-AM is applied, or DL data is tied to RRC reattempts and RRC success.

Figure 3:
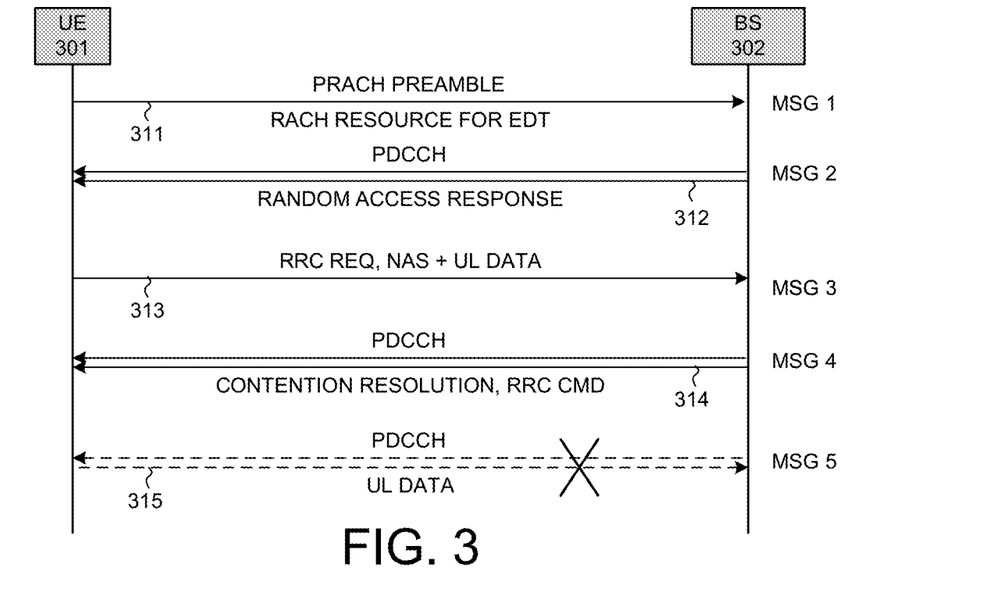
FIG. 3 illustrates a first embodiment of a message flow of a random-access channel (RACH) procedure supporting uplink EDT via MSG 3.

FIG. 3 illustrates a first embodiment of a message flow of a random-access channel (RACH) procedure supporting UL-EDT via MSG3. In step 311, UE 301 transmits a preamble (MSG1) over a random-access channel (RACH) to BS 302 to start a RACH procedure. In step 312, UE 301 receives a random-access response (RAR) (MSG2) over PDCCH from BS 302. For MO-EDT, the RACH procedure is initiated when UE 301 has uplink data to be transmitted to the network. If UE 301 is an MTC or NB-IoT device, the amount of uplink data to be transmitted may be very small. If UE 301 knows it is sending only one piece of uplink data, UE 301 can apply UL-EDT. This can be done through the use of the RRC connection request or resume request message (MSG3). Accordingly, in step 313, UE 301 sends an RRC connection request or resume request message to BS 302 (MSG3). The MSG3 comprises bundled uplink data. In step 314, BS 302 sends a contention resolution message over PDCCH, which comprises an RRC connection setup or resume or release message back to UE 301 (MSG4). If there is DL data for UE 301 in the network side, then the network can transmit the DL data in MSG4 as well (optional).

Note that in the legacy procedure, the UL NAS signaling message or the UL NAS message carrying uplink data can be transmitted in an UL RRC container message in MSG5 (step 315). For the mobile originated data transmission, i.e., UL data transmission, the UE needs to go through the full RACH procedure, i.e., MSG1 for preamble transmission, MSG2 for RAR reception, MSG3 for RRC connection request or resume request, and MSG4 for contention resolution and RRC connection response, and then transmit the UL data in MSG5, and then release the RRC connection and return to RRC idle. For IoT application, most applications are with small data transmission. Therefore, the signaling overhead is significant by going through the legacy procedure. With MO-EDT, the UL data is transmitted in MSG3 (step 313) instead of MSG5 (step 315). Also note that the name of the RRC signaling for MSG3 is not limited to RRC connection setup or resume request, the name for EDT is RRC Early data request.

For high reliability, transmission protocols such as Hybrid Automatic Repeat reQuest (HARQ) and Radio Link Control Acknowledged Mode (RLC-AM) are configured and controlled by a base station. However, MSG3 in UL EDT contains RRC parts transmitted without RLC-AM. The reliability of these transmissions is determined by HARQ, and by the success of the prior transmissions in the RACH procedure. There is no RLC-AM. MSG3 transmission for UL EDT can be considered to be successful when the RACH procedure is successful, i.e. when Contention Resolution has been received by the UE. Therefore, MSG3 reliability is mainly dependent on RACH re-attempt strategy. To have high reliability for the UL message, a) either EDT could be completely avoided, or b) the Access re-attempt strategy should have high robustness, i.e. after N attempts on EDT, legacy RACH with minimal size MSG3 is applied. In one embodiment, for UL EDT, there would be different set of access reattempt parameters configured for the UE for different types of access (e.g., normal access, emergency access, etc.).

Figure 4:
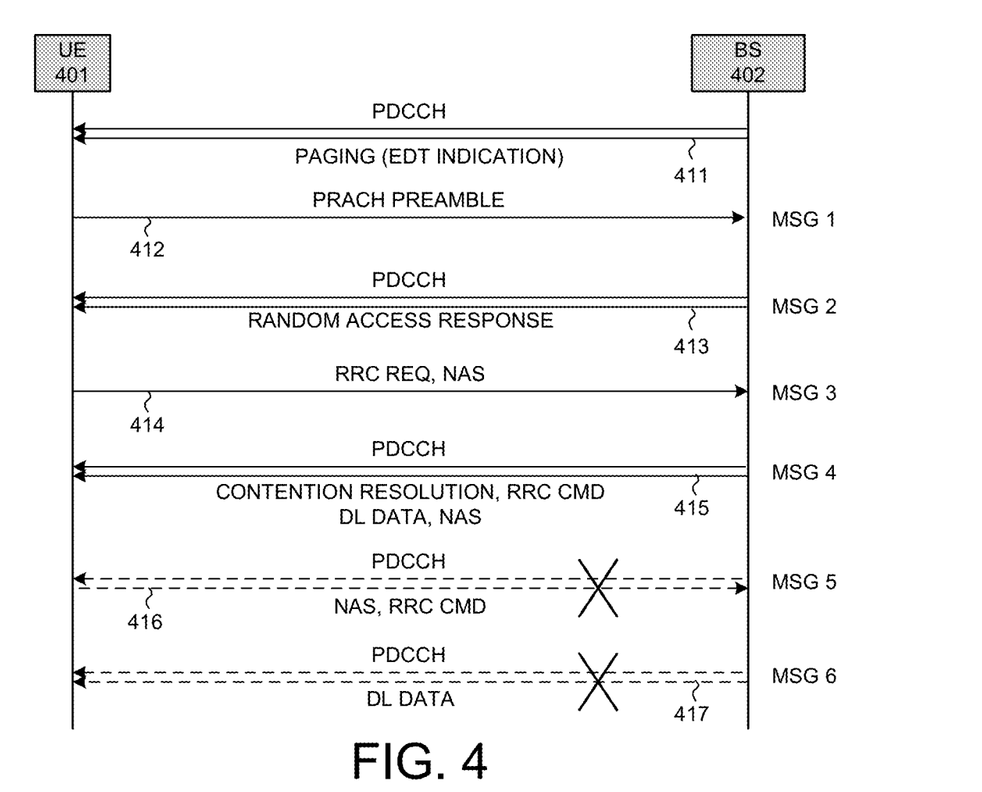
FIG. 4 illustrates a second embodiment of a message flow of a random-access channel (RACH) procedure supporting downlink EDT via MSG 4.

FIG. 4 illustrates a second embodiment of a message flow of a random-access channel (RACH) procedure supporting DL-EDT via MSG 4. In step 411, UE 401 receives a paging message from BS 402 over PDCCH. In step 412, UE 401 transmits a preamble over a random-access channel (RACH) to BS 402 to start a RACH procedure (MSG1). In step 413, UE 401 receives a random-access response (RAR) over PDCCH from BS 402 (MSG2). For MT-EDT, the RACH procedure is triggered by the network when UE 401 has downlink data to be received from the network. For network-triggered MT-EDT, in the paging message, a new EDT indicator should be added to indicate the paged UE to go through EDT procedure. In step 414, UE 401 sends an RRC connection request or resume request message to BS 402 (MSG3). The MSG3 comprises bundled paging response and/or uplink data, which can be sent only one piece, if any. If UE 401 is an MTC or NB-IoT device, the amount of downlink data to be received may be very small. If BS 402 knows it is sending only one piece of downlink data to UE 401, BS 402 can apply DL-EDT. This can be done through the use of the MSG4. Accordingly, in step 415, BS 402 sends a MSG4, which comprises contention resolution message, an RRC connection setup or RRC Early Data Complete or resume response message and bundled with DL data. For contention resolution, BS does not wait for NAS reply and it can send early contention resolution before sending NAS reply. This means MSG4 can be split in two messages, the first one is MAC PDU containing the UE contention resolution identity and the second one is the RRC response message with the bundled DL data.

Note that in the legacy procedure, the DL NAS signaling or DL NAS data can be transmitted in a DL RRC container message in MSG6 (step 417). For the mobile terminated data transmission, i.e., DL data transmission, first the network should page the UE to request the RRC-Idle mode UE to turn to RRC-Connected mode. Then the UE should go through the full RACH procedure i.e., MSG1 for preamble transmission, MSG2 for RAR reception, MSG3 for RRC connection setup request or resume request, and MSG4 for contention resolution and RRC connection response, and transmit RRC connection setup complete in MSG5, and receive the DL data in MSG6, and then release the RRC connection and return to RRC-Idle mode. For IoT application, most applications are with small data transmission. Therefore, the signaling overhead is significant by going through the legacy procedure. With MT-EDT, the DL data is received in MSG4 (step 415) instead of MSG6 (step 417).

MSG4 contains a contention resolution MAC CE and RRC signaling. MSG4 can be further transmitted in two steps, the first step transmits early contention resolution to resolve the contention (before the contention resolution timer timeout) and the second step transmits the RRC configuration. MSG4 for DL-EDT can be done in two ways, a) if early contention resolution is used, the MSG4 transmission reliability is decoupled from RACH procedure success/re-attempts, b) if contention resolution is sent with MSG4 (including DL Data) the MSG4 transmission reliability is related to RACH procedure success/Re-attempts. DL EDT reliability is further related to paging reliability. To have high reliability for the DL message when early Contention Resolution is applied, a non-RACH mechanism must be applied, e.g. use of fixed configuration RLC-AM, that will force the UE to transmit a RLC-AM Ack Status Report, or e.g. if the DL message is always bundled with an RRC Command Message in the DL it could be tied to RRC reattempts and RRC success. To have high reliability for the DL message when early Contention Resolution is not applied, a high robustness RACH procedure could ensure high reliability. However, in this case, the method of using fixed configuration RLC-AM or tying to RRC reattempts could also be applied.

It is quite complex to control each transmission independently for DL EDT as there are several cases to be considered. It seems easier to try to control whether to use EDT or not. In one embodiment, for DL EDT, there would be an indication in the paging message to trigger whether the UE would use legacy RACH or not for the paging response, or alternatively there would just be an indication in network signalling to the base-station that whether or not MSG4 signalling and data should be bundled together for DL EDT.

Figure 5:
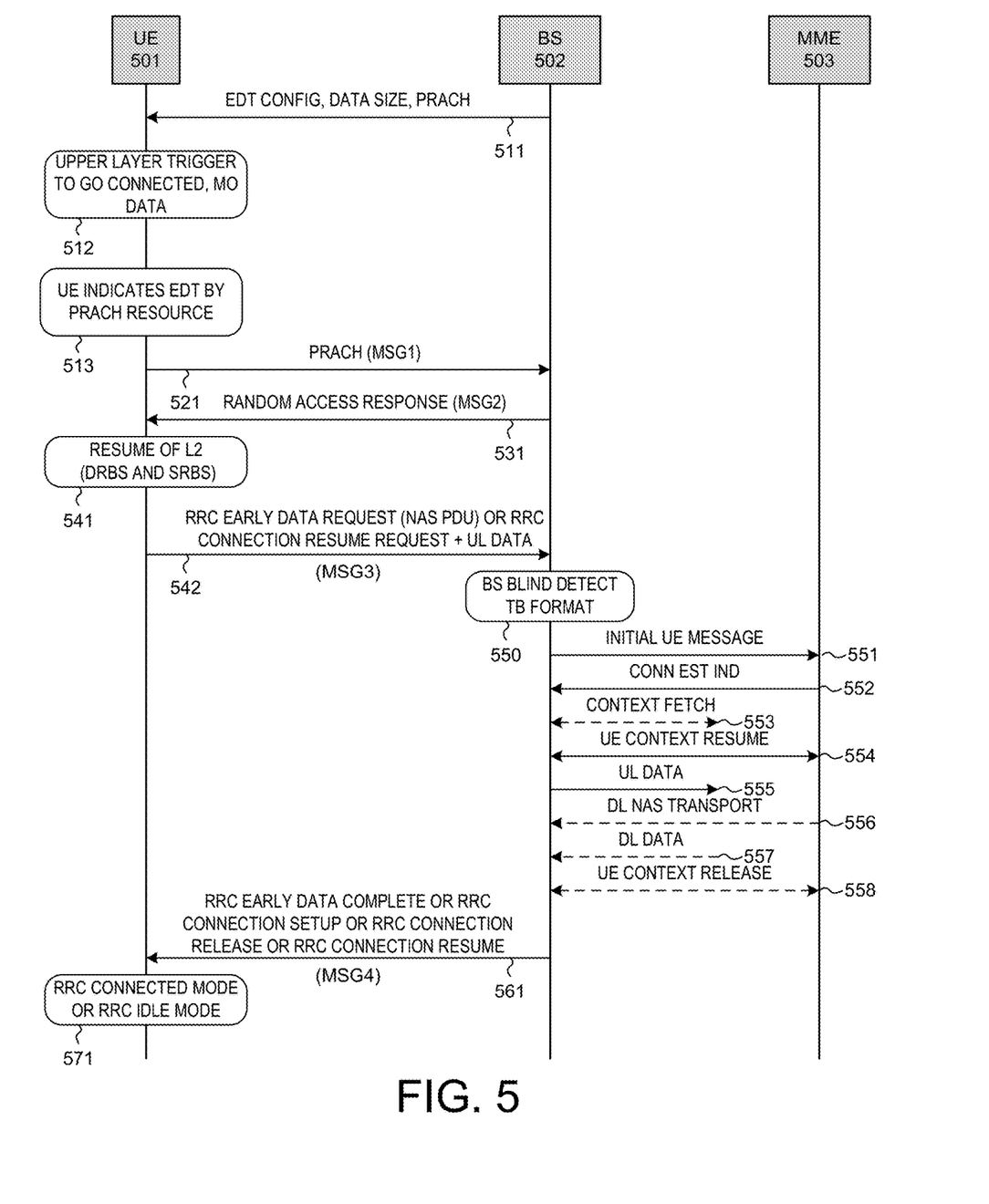
FIG. 5 illustrates a detailed message flow between a UE and a network for configuring and performing EDT with high reliability.

FIG. 5 illustrates a detailed message flow between a UE and a network for configuring and performing EDT with high reliability. In step 511, EDT configuration is broadcasted from BS 502 to UEs including UE 501. The EDT configuration comprises a MAX PDU size for EDT, and/or another transport block (TB) format parameter, and PRACH resources for UE to indicate the UE decision to use EDT. In step 512, upper layer triggers UE 501 to go to RRC connected mode. For Mobile Originated (MO) data, MO-EDT is applicable. In step 513, UE 501 determines whether EDT is allowed by checking if the data available for transmission is less than the MAX PDU size for EDT. In step 521, through PRACH MSG1, UE 501 indicates to the network the intention to use EDT by sending a RACH preamble over allocated PRACH resource for EDT. In step 531, BS 502 sends a random-access response (RAR) back to UE 501 (MSG2). If BS 502 chooses to use EDT for UE 501 that has indicated the intention to use it, BS 502 provides a sufficiently large grant to accommodate the Uplink Data in MSG3, or BS 502 indicates a flexible grant. For flexible grant, UE 501 may select Transport Format and corresponding TB size from a limited set of options.

In step 541, in user plane, UE 501 resumes Data Radio Bearers (DRBs) and Security Radio Bearers (SRBs) from the stored UE configuration. Except for SRB0 and SRB1 for reception of RRC Connection Resume message, this was previously done after the UE receives RRC Connection Resume message and moves to RRC Connected mode. In step 542, in control plane, RRC Early Data request (with S-TMSI) with a NAS PDU that contains UL Data. RRC Resume Request (with Resume ID) that is MAC multiplexed with a DRB PDU that contains UL Data is sent to BS 502 (MSG3). Alternatively, in user plane, RRC Resume Request (with Resume ID) that is MAC multiplexed with a DRB PDU that contains UL Data is sent to BS 502 (MSG3). Note that transmission of NAS PDU and UL Data was previously done at earliest at the time of the RRC Connection Complete message, which is also known as MSG5 of the RACH procedure.

Upon receiving the uplink data, BS 502 blindly detects the TB format (step 550) and interacts with the network including MME 503. During this period of time it is assumed that by BS or MME trigger, there will be a decision to send the UE either back to idle mode or to RRC connected. Depending on this decision, some of the steps in this period may not be needed. A possible reason for moving the UE to RRC connected mode could be e.g. that more data is expected in the UL or DL. In step 551, the initial UE Message with a NAS PDU that contains UL Data is sent to MME 503. In step 552, BS 502 acquires UE capabilities. This is needed if the UE is to continue in Connected mode. If instead the eNB receives an END marker indication from the MME, there is no more DL NAS transmission for the UE and the UE can be sent to Idle. In step 553, BS 502 acquires UE context by context fetch, if needed. In step 554, UE context resume request and response are exchanged between BS 502 and MME 503. In step 555, UL data is transmitted from BS 502 to a Serving GW. In step 556, optionally there can be DL data or a DL NAS message in response to the previously transmitted UL data or UL NAS message. In step 557, optionally there can be DL data to BS 502 in response to the previously transmitted UL data. In step 558, UE 501 transition to Idle may be triggered by BS 502 or MME 503.

Step 561 is MSG4. For EDT, the network can configure UE 501 to stay in RRC connected mode by messages control plane RRC Connection Setup or user plane RRC Connection Resume, or BS 502 can configure UE 501 to go back to RRC idle mode by control plane RRC Early Data Complete or by user plane RRC Release. The RRC Early Data Complete message can optionally carry a NAS PDU that contains DL Data or a DL NAS message, or the RRC release message can optionally be MAC multiplexed with a DRB PDU that contains DL Data. For the user plane solution, the NCC (Next Hop Changing Counter) IE for the next connection must be provided, in order to be able to perform EDT. Finally, in step 571, UE 501 goes to RRC connected mode or remains in RRC Idle mode accordingly.

FIG. 6 shows the NPRACH parameters in the system information. NPRACH resource configuration is broadcasted in SIB2-NB for the anchor carrier and in SIB22-NB for the non-anchor carries. Up to three NPRACH repetitions can be configured to support different CE levels in a cell. To not collide with the NPRACH resource configuration to legacy UEs, the configuration on NPRACH resource for EDT should be independent to the legacy NPRACH resource configuration. An EDT NPRACH resource pool will associate to a certain TB size of MSG3, assuming the configuration is specific to a certain CE level with a certain NPRACH repetition level. NB-IOT uses different repetition levels to support different coverage levels. For example, for normal coverage, transmission of PRACH signal may repeat once; but for deep coverage, transmission of PRACH may repeat 32 times for the receiver to accumulate SNR for decoding. A new maximum TB size of MSG3 association field can be added in the NPRACH parameters, e.g., EDT-TBS. BS broadcasts NPRACH resource for EDT configurations in the system information, SIB2-NB for the anchor carrier and SIB22-NB for the non-anchor carriers similar to the legacy NB-IoT.

FIG. 7 shows NRPACH parameters for EDT. Note that the naming of NPACH parameters is not limited to the naming as it serves the same purposes. An EDT-capable UE considers RRC message size, NAS message size and data in the buffers. If all can be transmitted in one TB, the UE determines a NPRACH resource pool indicating the EDT, and randomly selects a NPRACH resource from the corresponding PRACH pool. UE transmits the PRACH preamble (MSG1) in the selected NPRACH resource. The configuration on NPRACH resource for EDT can be independent to the legacy NPRACH resource configuration. A new TB size of MSG3 association field can be added in the NPRACH parameters, e.g., EDT-TBS. BS broadcasts NPRACH resource for EDT configurations in the system information, SIB2-NB for the anchor carrier and SIB22-NB for the non-anchor carriers. A UE determines a NPRACH resource pool indicating the TB size which can nearly accommodate RRC message size, NAS message size and data in the buffers, randomly selects a NPRACH resource from the corresponding PRACH pool, and transmits the PRACH preamble (MSG1) in the selected NPRACH resource.

Note that the maximum transport block size TBS broadcasted in system information is selected from multiple values (e.g., 8 from NPUSCH tables). Up to 4 possible TBS which are smaller than or equal to the maximum broadcast TBS values can be chosen by UE. In one embodiment, the network can enable the use of TBS smaller than the maximum configured TBS.

In some situations, UE needs to consider falling back to the legacy RRC connection establishment/resumption procedure, instead of using EDT. For example, when no PRACH resource is broadcasted for data in MSG3 procedure, or when UE intends to perform NAS signalling procedure. Further, if not all UL data (RRC message, NAS message and data) can be transmitted by the highest indicated TB size of EDT configured by eNB, either a) the UE reverts to the legacy procedure, or b) the UE indicates a TB size to transmit the NAS message without data. For the cases that a UE indicates the need of a certain size of MSG3, but for any reason eNB allocates smaller size in UL grant in EDT, the UE may a) consider to transmit part of the UL data with RRC and NAS message and request more UL grant or b) revert to the legacy procedure.

In one embodiment, if no PRACH resource is broadcasted for EDT or if UE intends to perform NAS signalling procedure, a UE uses the legacy RRC connection establishment/resumption procedure for data transmission. In another embodiment, if not all UL data (RRC message, NAS message and data) can be transmitted by the highest indicated TB size, either a) the UE reverts to the legacy procedure, or b) the UE indicates a TB size to transmit the NAS message without data. In yet another embodiment, if UL grant size is smaller than the request by a UE, either a) UE transmits part of the UL data with RRC and NAS message and request more UL grant, or b) UE reverts to the legacy procedure.

Figure 8:
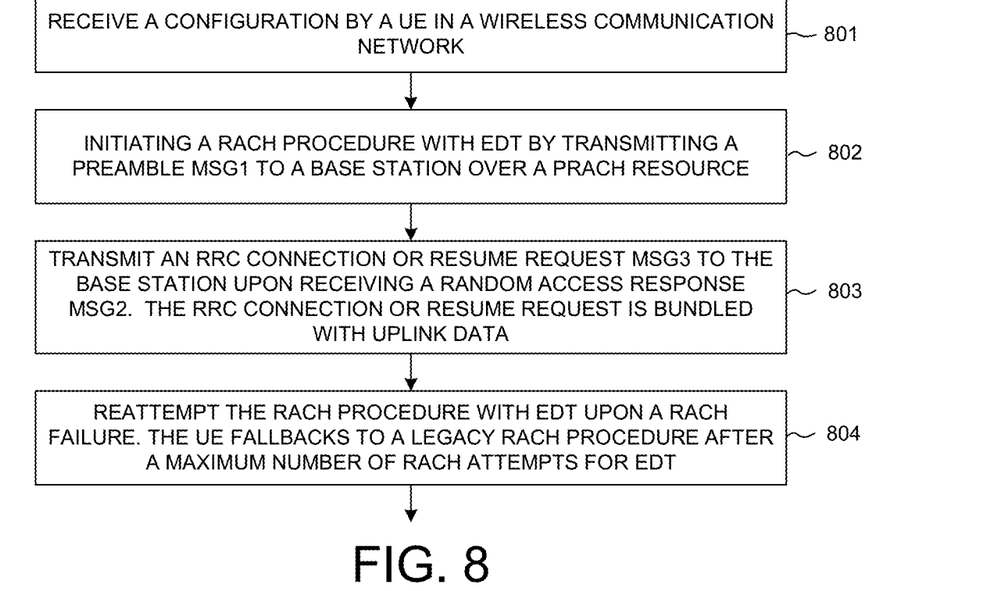
FIG. 8 is a flow chart of a method of uplink early data transmission with high reliability from UE perspective in a wireless communication network.

FIG. 8 is a flow chart of a method of uplink early data transmission with high reliability from UE perspective in a wireless communication network. In step 801, a UE receives a configuration for early data transmission (EDT) in a wireless communication network. In step 802, the UE initiates a random-access channel (RACH) procedure with EDT by transmitting a preamble (MSG1) to a base station over a physical RACH (PRACH) resource. In step 803, the UE transmits a radio resource control (RRC) connection or resume request (MSG3) to the base station upon receiving a random-access response (MSG2). The RRC connection or resume request is bundled with uplink data. In step 804, the UE re-attempts the RACH procedure with EDT upon a RACH failure. The UE fallbacks to a legacy RACH procedure after a maximum number of RACH attempts for EDT.

Figure 9:
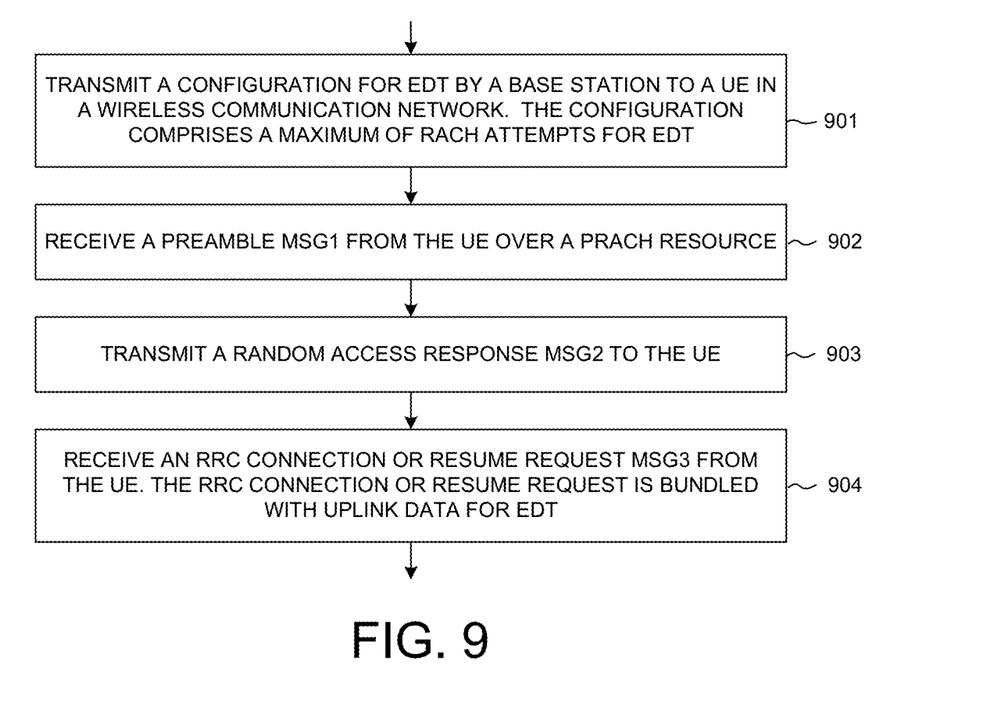
FIG. 9 is a flow chart of a method of uplink early data transmission with high reliability from BS perspective in a wireless communication network.

FIG. 9 is a flow chart of a method of uplink early data transmission with high reliability from BS perspective in a wireless communication network. In step 901, a base station transmits a configuration for early data transmission (EDT) to a UE in a wireless communication network. The configuration comprises a maximum number of random-access channel (RACH) attempts for EDT. In step 902, the base station receives a random-access preamble (MSG1) from the UE over a physical RACH (PRACH) resource. In step 903, the base station transmits a random-access response (MSG2) to the UE. In step 904, the base station receives a radio resource control (RRC) connection or resume request (MSG3) from the UE. The RRC connection or resume request is bundled with uplink data for EDT.

Figure 10:
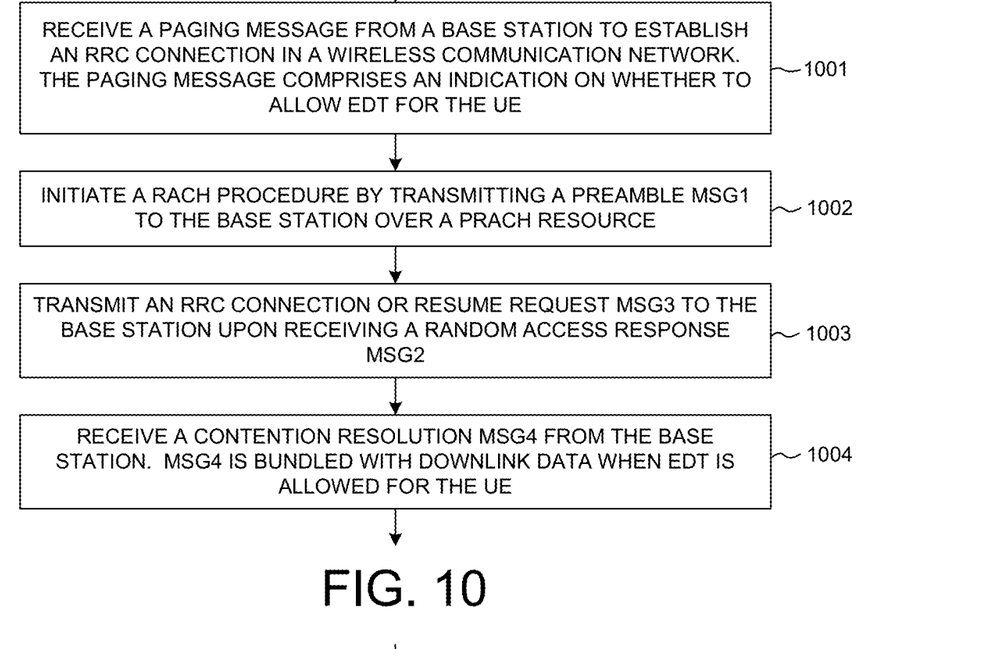
FIG. 10 is a flow chart of a method of downlink early data transmission with high reliability from UE perspective in a wireless communication network.

FIG. 10 is a flow chart of a method of downlink early data transmission with high reliability from UE perspective in a wireless communication network. In step 1001, a UE receives a paging message from a base station to establish a radio resource control connection in a wireless communication network. The paging message comprises an indication on whether to allow early data transmission (EDT). In step 1002, the UE initiates a random-access channel (RACH) procedure with EDT by transmitting a preamble (MSG1) to the base station over a physical RACH (PRACH) resource. In step 1003, the UE transmits an RRC connection or resume request (MSG3) to the base station upon receiving a random-access response (MSG2). In step 1004, the UE receives a contention resolution (MSG4) from the base station. MSG4 is bundled with downlink data when EDT is allowed for the UE.

Figure 11:
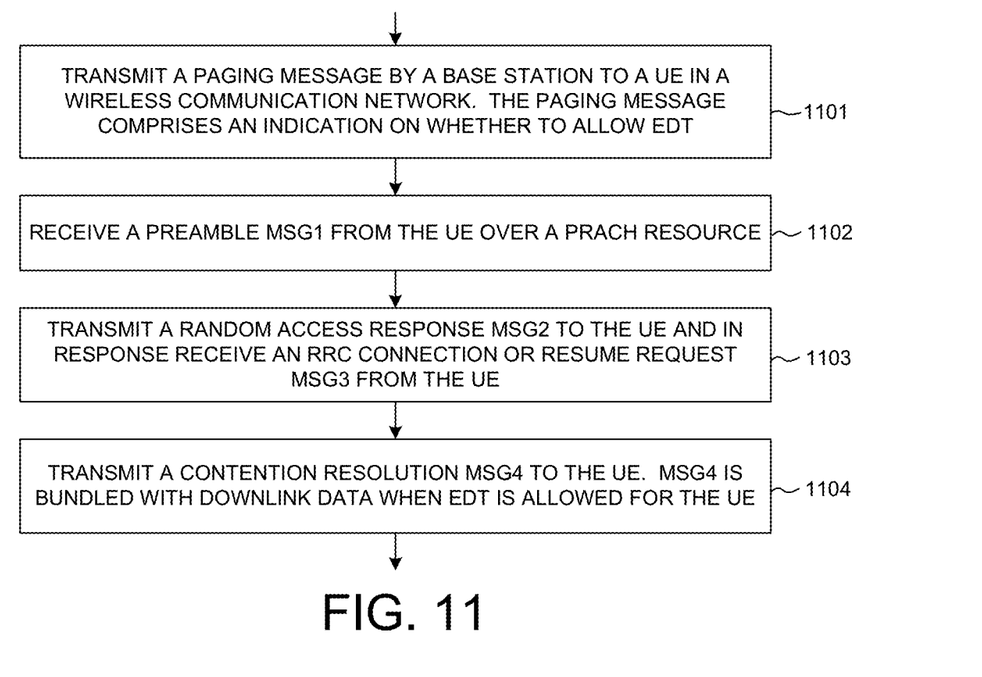
FIG. 11 is a flow chart of a method of downlink early data transmission with high reliability from BS perspective in a wireless communication network.

FIG. 11 is a flow chart of a method of downlink early data transmission with high reliability from BS perspective in a wireless communication network. In step 1101, a base station transmits a paging message to a user equipment (UE) to establish a radio resource control connection in a wireless communication network. The paging message comprises an indication on whether to allow early data transmission (EDT). In step 1102, the base station receives a preamble (MSG1) from the UE over a physical random-access channel (PRACH) resource. In step 1103, the base station transmits a random-access response (MSG2) to the UE and in response receiving an RRC connection or resume request (MSG3) from the UE. In step 1104, the base station transmits a contention resolution (MSG4) to the UE. MSG4 is bundled with downlink data when EDT is allowed for the UE.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving a paging message from a base station by a user equipment (UE) to establish a radio resource control connection in a wireless communication network, wherein the paging message comprises an indication on whether to allow network-triggered downlink early data transmission (EDT);
   initiating a random-access channel (RACH) procedure by transmitting a preamble (MSG1) to the base station over a physical RACH (PRACH) resource;
   transmitting a radio resource control (RRC) connection or resume request (MSG3) in response to the paging message to the base station upon receiving a random-access response (MSG2), wherein the UE indicates a preference for downlink EDT by an indication in the RRC connection or resume request in MSG3; and
   receiving a contention resolution (MSG4) from the base station, wherein MSG4 is bundled with downlink data when network-triggered downlink EDT is allowed for the UE as indicated by the indication in MSG3.

2. The method of claim 1, wherein a fixed Radio Link Control Acknowledged Mode (RLC-AM) is applied for the downlink data reliability.

3. The method of claim 1, wherein the downlink data is always bundled with an RRC command message and tied to RRC reattempts.

4. The method of claim 1, wherein the UE receives the contention resolution before receiving an RRC response message from the base station.

5. The method of claim 1, wherein the UE receives the contention resolution together with an RRC response message from the base station.

6. The method of claim 1, wherein the UE indicates the preference for EDT by bundling a NAS paging response and the RRC connection or resume request in MSG3.

7. The method of claim 1, wherein the bundling of the downlink data with MSG4 depends on a Quality of Service parameter signaled by the network.

8. A User Equipment (UE), comprising:
   a receiver that receives a paging message from a base station to establish an RRC connection in a wireless communication network, wherein the paging message comprises an indication on whether to allow network-triggered downlink early data transmission (EDT);
   a random-access channel (RACH) handling circuit that initiates a RACH procedure by transmitting a preamble (MSG1) to a base station over a physical RACH (PRACH) resource;
   a transmitter that transmits a radio resource control (RRCI connection or resume request (MSG3) in response to the paging message to the base station upon receiving a random-access response (MSG2), wherein the UE indicates a preference for downlink EDT by an indication in the RRC connection or resume request in MSG3; and
   a downlink EDT handling circuit that receives a contention resolution (MSG4) from the base station, wherein MSG4 is bundled with downlink data when network-triggered downlink EDT is allowed for the UE as indicated by the indication in MSG3.

9. The UE of claim 8, wherein a fixed Radio Link Control Acknowledged Mode (RLC-AM) is applied for the downlink data reliability.

10. The UE of claim 8, wherein the downlink data is always bundled with an RRC command message and tied to RRC reattempts.

11. The UE of claim 8, wherein the UE receives the contention resolution before receiving an RRC response message from the base station.

12. The UE of claim 8, wherein the UE receives the contention resolution together with an RRC response message from the base station.

13. The UE of claim 8, wherein the UE indicates the preference for EDT by bundling a NAS paging response and the RRC connection or resume request in MSG3.

14. The UE of claim 8, wherein the bundling of the downlink data with MSG4 depends on a Quality of Service parameter signaled by the network.

15. A method, comprising:
   transmitting a paging message by a base station to a user equipment (UE) to establish a radio resource control connection in a wireless communication network, wherein the paging message comprises an indication on whether to allow network-triggered downlink early data transmission (EDT);
   receiving a preamble (MSG1) from the UE over a physical random-access channel (PRACH) resource;
   transmitting a random-access response (MSG2) to the UE and in response receiving a radio resource control (RRC) connection or resume request (MSG3) from the UE, wherein a preference for downlink EDT is indicated by an indication in the RRC connection or resume request in MSG3; and
   transmitting a contention resolution (MSG4) to the UE, wherein MSG4 is bundled with downlink data when network-triggered downlink EDT is allowed for the UE as indicated by the indication in MSG3.

16. The method of claim 15, wherein a fixed Radio Link Control Acknowledged Mode (RLC-AM) is applied for the downlink data reliability.

17. The method of claim 15, wherein the downlink data is always bundled with an RRC command message and tied to RRC reattempts.

18. The method of claim 15, wherein the base station transmits the contention resolution before sending an RRC response message to the UE.

19. The method of claim 15, wherein the base station transmits the contention resolution together with an RRC response message to the UE.

20. The method of claim 15, wherein the base station receives the preference for EDT from the UE by receiving a NAS paging response together with the RRC connection or resume request in MSG3.

* * * * *

UNITED STATES PATENT AND TRADEMARK OFFICE
CERTIFICATE OF CORRECTION

PATENT NO. : 10,849,164 B2
APPLICATION NO. : 16/145788
DATED : November 24, 2020
INVENTOR(S) : Johansson et al.

Page 1 of 1

It is certified that error appears in the above-identified patent and that said Letters Patent is hereby corrected as shown below:

In the Claims

Column 11, Line 60, Claim 8: --(RRCI--, should be --(RRC)--

Signed and Sealed this
Second Day of February, 2021

Drew Hirshfeld
*Performing the Functions and Duties of the
Under Secretary of Commerce for Intellectual Property and
Director of the United States Patent and Trademark Office*